United States Patent [19]
Fechter et al.

[11] Patent Number: 5,531,307
[45] Date of Patent: Jul. 2, 1996

[54] SHEAR ELEMENT TYPE CLUTCH

[75] Inventors: Mark A. Fechter, West Bend; George N. P. Hansen, Milwaukee, both of Wis.

[73] Assignee: Weasler Engineering, Inc., West Bend, Wis.

[21] Appl. No.: 287,740

[22] Filed: Aug. 9, 1994

[51] Int. Cl.[6] .......................... F16D 43/208; F16D 27/00
[52] U.S. Cl. .................. 192/56.4; 192/56.5; 192/84 PM; 192/84 T; 192/93 C
[58] Field of Search .................. 192/56 R, 84 T, 192/84 PM, 93 C, 40, 56.4, 56.43, 56.5; 464/35, 37, 29, 152

[56] References Cited

U.S. PATENT DOCUMENTS

| | | | |
|---|---|---|---|
| 2,498,399 | 2/1950 | Dodge | 192/93 X |
| 2,621,494 | 12/1952 | Cross | 464/29 |
| 2,842,005 | 7/1958 | Dunnihoo. | |
| 2,843,237 | 7/1958 | Carr | 192/93 X |
| 2,960,852 | 11/1960 | Schröter et al.. | |
| 3,240,304 | 3/1966 | Wickersham | 192/84 PM |
| 3,726,373 | 4/1973 | Miller | 192/84 PM |
| 3,827,260 | 8/1974 | Kato | 464/35 |
| 4,429,775 | 2/1984 | Teramoto. | |
| 4,744,447 | 5/1988 | Kato et al.. | |
| 4,860,866 | 8/1989 | Stanek | 192/84 T |
| 4,896,755 | 1/1990 | Girguis. | |
| 4,901,836 | 2/1990 | Stenmark et al.. | |
| 4,977,989 | 12/1990 | Ashikawa et al.. | |
| 4,991,701 | 2/1991 | Nakano et al.. | |
| 5,005,684 | 4/1991 | Fujii. | |
| 5,035,311 | 7/1991 | Girguis. | |

FOREIGN PATENT DOCUMENTS

| | | | |
|---|---|---|---|
| 2413580 | 8/1979 | France | 192/93 C |

*Primary Examiner*—Rodney H. Bonck
*Attorney, Agent, or Firm*—Quarles & Brady

[57] ABSTRACT

A shear element type torque overload clutch particularly adapted for an agricultural driveline has a compact shape in which the shear elements are arranged to move radially between the engaged and disengaged positions with the shear elements and the driving and driven parts of the clutch received within a cup shaped collar, which retains the shear elements radially. An electromagnetic coil, a permanent magnet or one or more springs may be used to axially shift the collar to the engaged position.

12 Claims, 3 Drawing Sheets

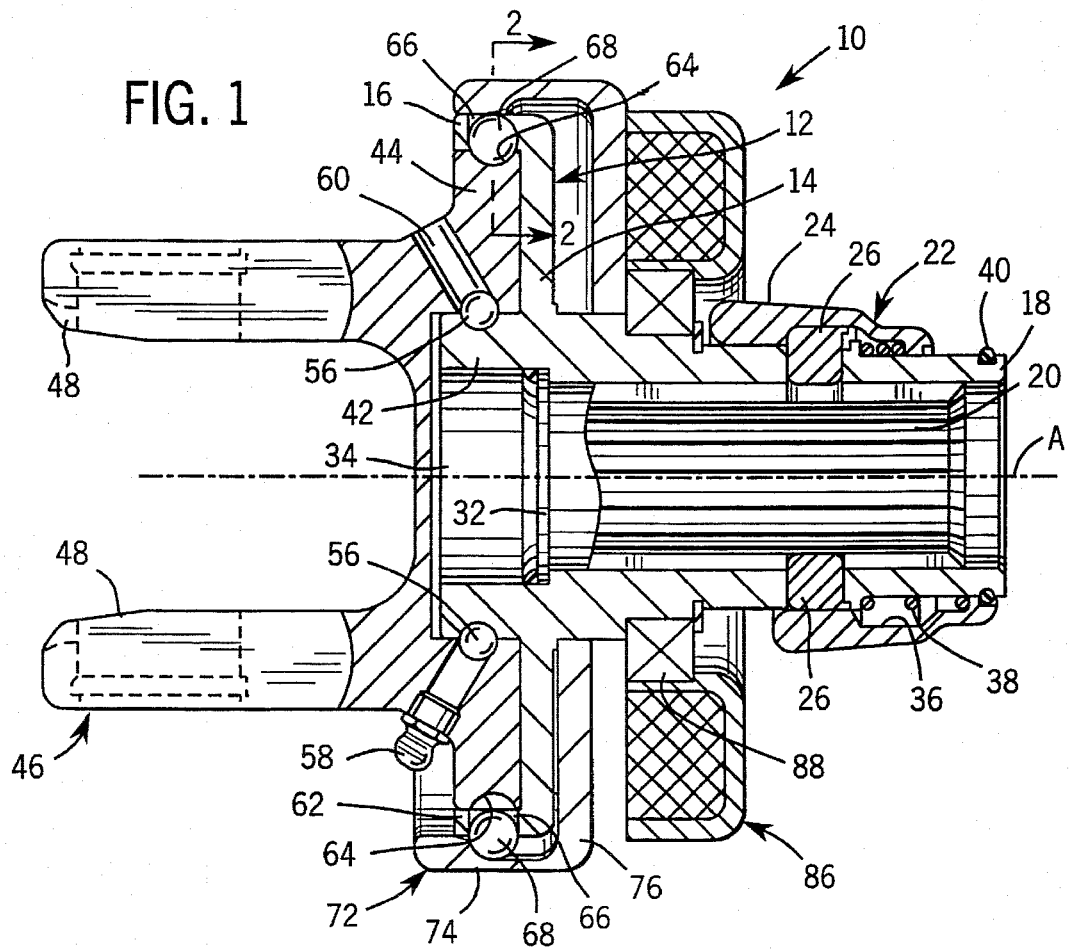

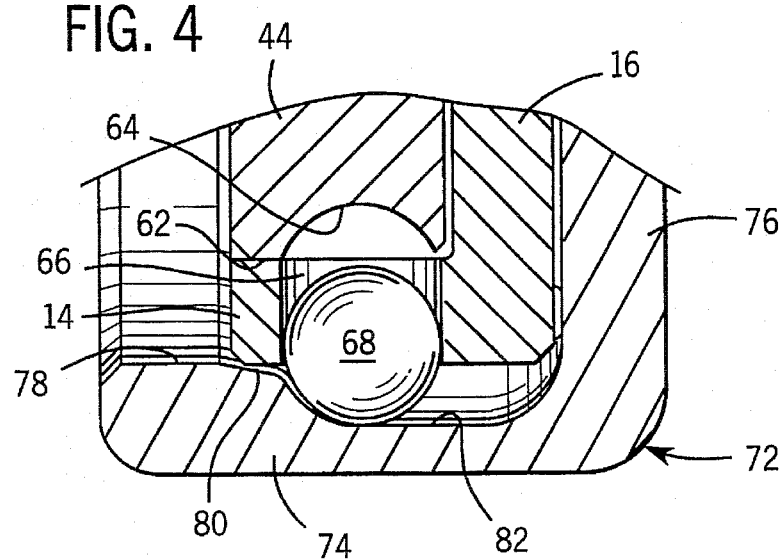
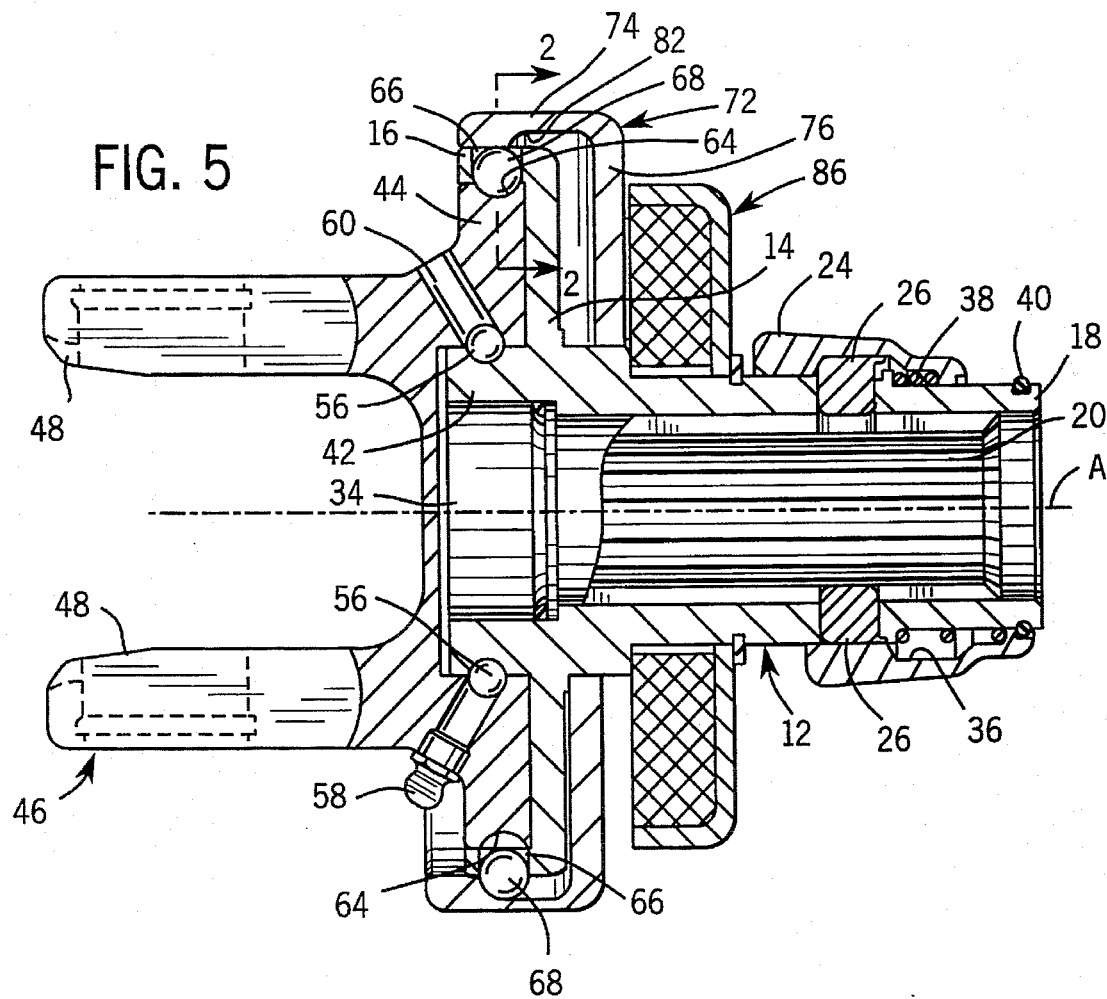

SHEAR ELEMENT TYPE CLUTCH

BACKGROUND OF THE INVENTION

1. Field of the Invention

This invention relates to shear element type clutches for transmitting torque from a driving member to a driven member, and in particular to such a clutch which is responsive to an overload torque to disconnect the two members.

2. Discussion of the Prior Art

Clutches which transmit torque between a driving part and a driven part through ball type shear elements engaged with both parts are known, for example from U.S. Pat. Nos. 2,842,005, 4,429,775, 4,991,701 and 5,005,684. In these devices, torque is transmitted from one part to the other utilizing the shear strength of the ball type shear elements, which span the interface between the two parts when the clutch is engaged, and climb out of the interface when the clutch is disengaged. It is also known to provide a collar having a ramped surface engaging the balls and biasing the collar so as to bias the balls into the engaged position. See for example U.S. Pat. No. 4,429,779.

In some applications, such as in an agricultural drive line, the axial distance which may permissibly be occupied by an overload clutch is limited. In general, the shorter that the clutch is, the better.

In addition, it is sometimes desirable, such as in an agricultural driveline, to be able to vary the maximum torque which the clutch can transmit as the clutch is being operated, or to override the clutch, for example by releasing it from engagement. Since the prior art ball type overload clutches had springs, the only way that the overload torque could be varied was by changing the force exerted by the springs on the collar, for example by changing the springs. This was a time consuming and impractical process. In addition, with the prior overload clutches, it was not possible to remotely override the clutch. Moreover, in a torque overload condition, the prior art spring biased clutches would continually seek to reengage, resulting in violent chattering at some speeds and rough operation when the overload condition persisted. These attempts to re-engage also created heat which caused early failure of the clutch.

SUMMARY OF THE INVENTION

The invention provides an overload clutch for transmitting torque from a driving member to a driven member having an outer wheel adapted for rotary engagement with one of the members and an inner wheel for rotary engagement with the other of the members. The outer wheel has a disc portion and a flange portion extending axially from the disc portion, the flange portion having a radially outward facing surface and a radially inward facing surface. The inner wheel has a radially outward facing surface in face to face proximity with the radially inward facing surface of the flange portion and the flange portion has defined within it at angularly spaced locations holes which extend radially from the inward facing surface of the flange portion to the outward facing surface thereof. The outward facing surface of the inner wheel has defined in it recesses at angularly spaced locations, the recesses being in registration with the holes in at least one angular position of the inner wheel relative to the outer wheel. A shear element is received in each hole, each shear element being sized so as to be moveable radially in the holes into or out of the recesses, each shear element always being at least partially engaged in a corresponding hole. Preferably, the shear elements are balls, the holes are round and the recesses are spherical and only so deep as to receive the balls up to less than one-half of their diameter. A collar is axially displaceable between an engaged position and a disengaged position. The collar retains the shear elements at least partially in the recesses in the engaged position and allows the shear elements to completely exit the recesses in the disengaged position. An actuator moves the collar from the disengaged position to the engaged position. This construction provides an axially and radially compact clutch which may be economically manufactured and is well suited for an agricultural driveline and other torque transmission applications.

In one useful form, the actuator is an electromagnetic coil. In this form, the clutch can be engaged or disengaged from a remote location, such as a tractor cab, since it is a simple matter to run wires from the remote location to the coil. Also, engagement force exerted by the coil on the collar is variable by varying the current through the coil, so as to advantageously allow varying the break-away torque, or maximum torque transmittable, of the clutch, and to do it from the remote location.

In this aspect the outer wheel may have a hub with the coil journaled on the hub. Preferably, an air gap exists between the coil and the collar in the engaged position, to eliminate frictional wear between the coil and the collar.

Preferably, the surface of the collar confronts each shear element with an inwardly facing surface which ramps radially outward in the axial direction in which the collar moves to go from the disengaged position to the engaged position. Thereby, a radially outward force on the shear elements, which is the result of transmitting torque through the clutch when the shear elements attempt to climb out of their corresponding recesses, produces an axial force on the collar which urges it into the disengaged position. The torque at which the collar is urged into a disengaged position can be varied by varying the angle of the ramp. Preferably, the default position (no actuating force on the collar) is the disengaged position.

In another useful aspect, the clutch further includes means biasing the collar out of complete disengagement and toward the engaged position. When the overload torque is reached and the collar moves toward the disengaged position, these biasing means urge the collar back toward the engaged position to partially reseat the shear elements in the recesses, but the continuance of the overload torque urges them back out of the recesses and the collar back toward the disengaged position. This "bouncing" of the collar between engaged and disengaged produces a relatively mild chattering noise that alerts the operator to the torque overload condition.

In another aspect, the actuator may be a permanent magnet, which may rotate with the collar. By using a permanent magnet, the differential in the axial force on the collar between the engaged position and the disengaged position is relatively great, so that the force can be high when engaged and relatively low when disengaged, which is desirable to avoid generating heat when the clutch is disengaged. In addition, the engagement force, which is a function of distance, can be easily adjusted by varying the gap between the magnet and the collar in the engaged position.

In yet another aspect, one or more springs may be used to urge the collar into the engaged position, to provide an inexpensive mechanical actuator for the clutch.

These and other objects and advantages of the invention will be apparent from the detailed description and from the drawings.

BRIEF DESCRIPTION OF THE DRAWINGS

FIG. 1 is a cross-sectional view of an overload clutch of the invention illustrating in the top half of FIG. 1, the clutch engaged (but disconnected from an input shaft) and in the bottom half showing the clutch disengaged (but connected to an input shaft);

FIG. 2 is a cross-sectional view of the clutch of FIG. 1 as viewed from the plane of the line 2—2 of FIG. 1;

FIG. 3 is a detail view of a portion of FIG. 1 illustrating the various parts of the clutch in the engaged position;

FIG. 4 is a detail view of a portion of FIG. 1 illustrating the various parts of the clutch in the disengaged position;

FIG. 5 is a view similar to FIG. 1 but of an alternate embodiment of the invention;

DETAILED DESCRIPTION OF THE PREFERRED EMBODIMENTS

Figure 6:
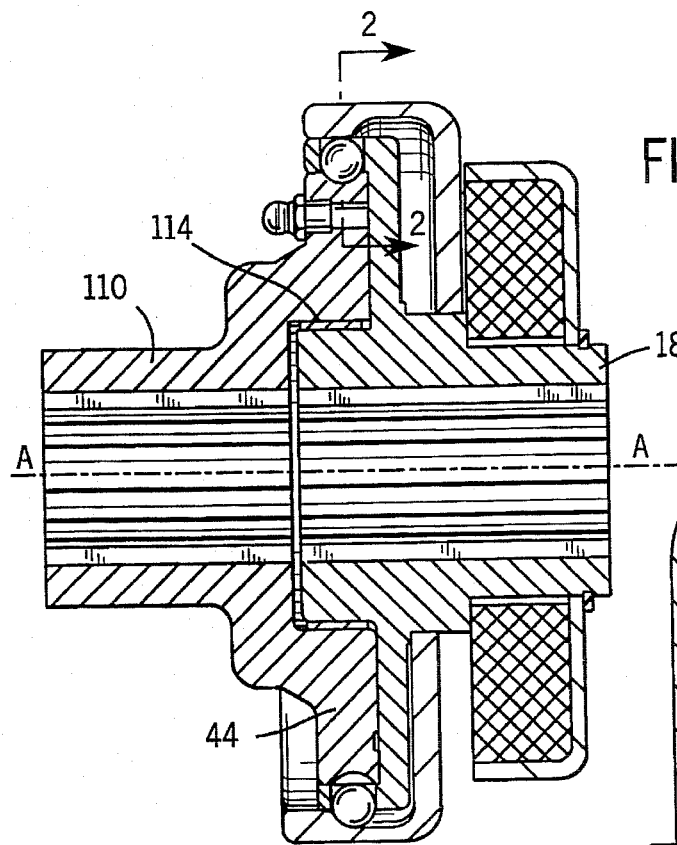
FIG. 6 is a view similar to FIG. 1 but of another alternate embodiment of the invention.

FIG. 1 illustrates a clutch 10 of the invention. In the upper half of FIG. 1 (above axis A), the clutch components are shown in an engaged position so as to transmit torque between a driving member and a driven member. Also, in the upper half of FIG. 1, the clutch is shown with its components disconnected from an input shaft or a power takeoff shaft, such as of an agricultural tractor. The lower half of FIG. 1 illustrates the various clutch components in a disengaged position so as to not transmit torque between a driving member and a driven member. The lower half of FIG. 1 also illustrates the clutch components in the position they would be in if the clutch was connected to the input shaft or the power takeoff shaft of an agricultural tractor.

The clutch 10 includes an outer wheel 12 which is generally cup shaped, having a radially extending disc portion 14 and an integral axially extending flange portion 16 at the outer extremity of the disc portion 14. The outer wheel 12 also includes a hub 18 which is provided integral with the disc portion 14 at the radially inner extremity of the disc portion 14. The hub 18 extends axially fore and aft from the disc portion 14 and has an internally splined bore 20 for receiving in rotary driving engagement about axis A the power takeoff shaft of an agricultural tractor.

Any suitable means may be used to axially lock a hub 18 onto a power takeoff shaft after the power takeoff shaft is slid into the bore 20. In the clutch 10, a latching slide lock 22 including a ring 24 and a plurality of angularly spaced pawls 26 is used. In the position shown in the top half of FIG. 1, the pawls 26, which are received in angularly spaced slots in the hub 18, are free to move outwardly and into undercut portion 36 of ring 24 when a power takeoff shaft is slid into the bore 20 (from the right as shown in FIG. 1). As the power takeoff shaft is slid into the bore 20, its splines slide beneath the pawls 26, continuing to hold them in the position shown in the upper half of FIG. 1. When the pawls 26 become aligned with an annular locking groove in the outer periphery of the power takeoff shaft as is well known, the pawls 26 are urged radially inwardly to seat in the groove. These pawls 26 are moved to this radially inward position by the ring 24 which is biased by spring 38. The ring 24 is prevented from being pushed off the end of hub 18 by a snap ring 40 seated in the end of the hub 18. Thus, in the position of the pawls 26 shown in the lower half of FIG. 1, the hub 18 is axially locked onto the power takeoff shaft.

Forward of the disc portion 14, radially inward of the flanged portion 16 and radially outward of the forward extending portion 42 of the hub 18 is defined an annular forwardly opening space in which is received inner wheel portion 44 of a yoke 46. The forward portion of yoke 46 has arms 48 configured to receive a cross of a universal joint, as is well known in the art. Torque would be transmitted through the arms 48 to the cross and to the remainder of the driveline, as is well known in the art.

The forward extending portion 42 of the hub 18 is received within a bore of the inner wheel portion 44 and has formed at its outer surface an outer race, and the inner surface of the bore in the inner wheel portion has formed an inner race. Between these inner and outer races are received balls 56 so that the outer wheel 12 and the inner wheel 44 are journaled together so as to be rotatable relative to one another but axially fixed together. A grease fitting 58 may be provided so as to lubricate the races of balls 56 and a plug 60 may be provided in order to load the balls 56 into the races.

The outer surface 62 of inner wheel 44 has formed in it at angularly spaced locations spherical recesses 64, each of which is of a depth less than its radius. At correspondingly angularly spaced locations when the clutch 10 is engaged, holes 66 are formed in the flange portion 16 which extend radially from the inner surface of the flange portion 16 to the outer surface of the flange portion 16. A shear element 68 is received within each hole 66, and when the clutch 10 is engaged, in the recesses 64 up to less than half of its diameter, so as to be radially slidable in the holes 66 and recesses 64 but axially and angularly captured in the holes 66. In the preferred embodiment, the elements 68 are in the shape of spherical balls. However, it should be understood that the invention is not limited to the shear elements being balls, but they could be any other suitable shape, such as cylindrical rollers, spherical rollers, or other shapes, with correspondingly shaped holes 66 and recesses 64.

A collar 72, which is also generally cup shaped, prevents the shear elements 68 from completely exiting the holes 66 radially. The collar 72 has an axially extending sleeve 74 integrally joined at its rearward end with a radially inwardly extending plate 76. Together the sleeve 74 and plate 76 define a forwardly opening cup with a hole in the middle of the plate 76 in which the hub 18 is received. The inner wheel 44, the outer wheel 12 and the shear elements 68 are received within this cup.

Referring particularly to FIGS. 3 and 4, the radially inner surface of the sleeve 74 has a forward cylindrical portion 78, an intermediate ramped portion 80 which is frusto-conically shaped and a rearward undercut portion 82. In normal operation of the clutch 10, the cylindrical portion 78 does not contact the shear elements 68 because, in the embodiment illustrated, it is desired that the shear elements 68 push out against the ramped portion 80 so as to exert a forward force on the collar to urge it into the disengaged position shown in the lower half of FIG. 1. As shown in FIG. 1, when the collar 72 moves to its forward, disengaged position, the shear elements 68 have climbed completely out of the recesses 64 into the space provided by the undercut portion 82.

The collar 72 is moved into the engaged position shown in the upper half of FIG. 1 by an actuator 86, which may be an electromagnetic coil. If the actuator 86 is an electromagnetic coil, it would normally be stationary, held for example by a chain attached to the tractor frame, and to allow that it is journaled on the hub 18 by a bearing 88. In the engaged position shown in the upper half of FIG. 1, a small air gap of approximately 0.010 inches would normally exist between the collar 72 and the actuator 86 so as to avoid frictional wear to either the coil 86 or the collar 72. The collar 72 is stopped in its rearward axial movement so as to provide the air gap by the shear elements 68 being pinched between the surface 80 and the recesses 64.

The magnetic force exerted on the collar 72 is determined by the current flowing through the actuator 86, which would preferably be remotely variable, such as from the cab of a tractor. The current to the actuator 86 could also be completely turned off from the tractor cab so that the force exerted on the collar 72 by the shear elements 68 would urge it to its disengaged position shown in the lower half of FIG. 1 to thereby disengage the inner wheel 44 from the outer wheel 12.

Optional springs 90 may also be provided (FIG. 3), which are received in holes 91 bored at angularly spaced locations in the rearwardly facing surface of the outer wheel 12 so as to prevent the collar 72 from moving into the disengaged position shown in the lower half of FIG. 1. FIG. 3 illustrates the springs 90 in a free or only slightly compressed state. Upon the collar 72 moving to the disengaged position, the springs 90 would be compressed to a greater extent and would urge the collar 72 back into a partially engaged position. When the shear elements reentered the recesses 64, they would be pushed back out of the recesses 64 (assuming a constant overload torque), which would result in a chattering noise as the shear elements move in and out of the recesses 64, to give the tractor operator notice that an overload torque condition exists.

Alternately, the actuator 86 could be a permanent magnet as shown in FIG. 5, instead of an electromagnetic coil. Since no wires are needed, the bearing 88 is deleted and the actuator 86 rotates with the hub 18 and collar 72. Applying a preload on the collar 72 by a permanent magnet makes the unit fully mechanical. The torque overload set point can be adjusted to any desired level by varying the air gap between the plate 76 and the magnet 86, such as with spacers. As the collar 72 is pulled away from the magnet 86, the air gap increases and the attraction decreases. When the collar 72 is in the disengaged position as shown at the bottom of FIG. 5, the air gap is sufficient so that there is only very little magnetic force on the collar tending to urge it into the engaged position. The centrifugal force on the shear elements in the disengaged position keeps the collar in the disengaged position so that no damaging heat is generated by the shear elements 68 being urged into the recesses 64. When the speed and torque are reduced, the centrifugal force of the shear elements can no longer overcome the magnetic force of the actuator 86, and the collar is pulled back into the engaged position, thereby forcing the shear elements 68 into the recesses 64. In this way, a large differential is achieved between the force exerted on the collar in the engaged position and the force exerted on the collar in the disengaged position.

In another alternative embodiment, rather than providing an actuator 86 as an electromagnetic coil or a permanent magnet, a series of angularly spaced compression springs could be provided between the disc portion 14 and the plate 76 as the actuator to urge the collar 72 into the engaged position shown in the top half of FIG. 1. This would look like the springs 90 in FIG. 3, although the springs may be of a heavier gauge and have a higher precompression in the engaged position. Of course, other types of biasing means, for example, belleville springs, could be used. While such spring biased embodiments would take advantage of the axial compactness provided by the invention, they would not take advantage of the ability to vary the overload torque or to override the clutch, which is provided by making the actuator 86 an electromagnetic coil. Also, the spring force exerted in the disengaged position can result in torque spikes in the driven member when the shear elements 68 try to reenter the recesses 64.

Figure 7:
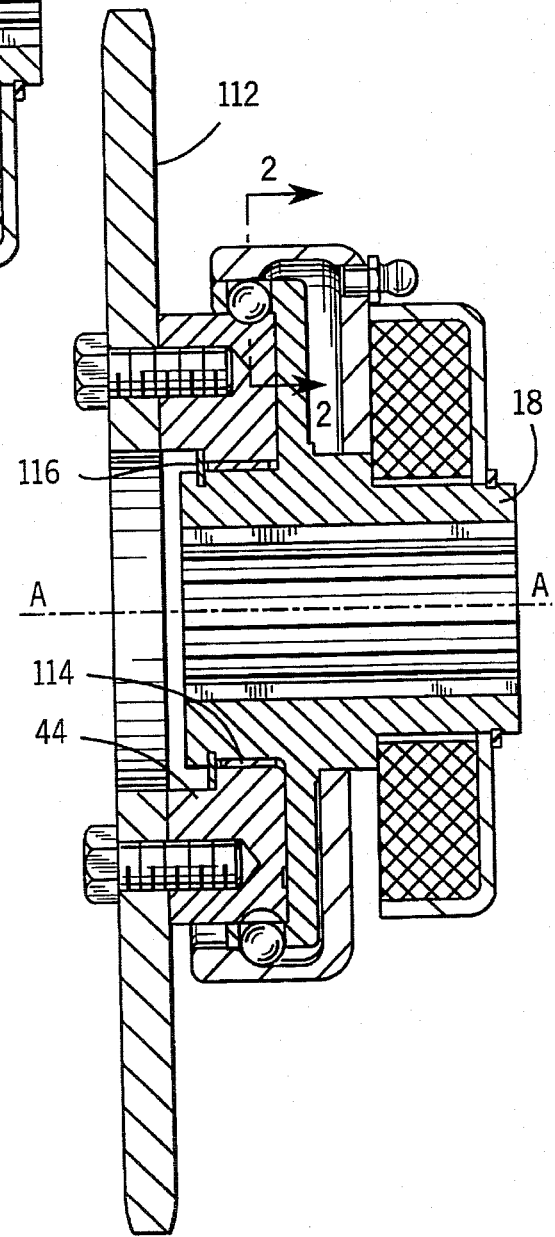
FIG. 7 is a view similar to FIG. 1 but of another alternate embodiment of the invention.

Moreover, the invention is not limited to transmitting torque in an agricultural driveline or to any particular application. Rather, the invention could be applied to transmit torque in any application, such as between two shafts, between a shaft and a sprocket or pulley, between two sprockets or pulleys, etc. For example, FIG. 6 illustrates one alternative for transmitting torque from one shaft, which could be engaged in the spline of hub 18, and another shaft, which could be engaged in the spline of hub 110, which is integral with inner wheel 44. FIG. 7 illustrates an alternative for transmitting torque from a shaft, which could be splined or keyed into hub 18, to a sprocket 112 which is bolted to the inner wheel 44. In both FIG. 6 and FIG. 7, the ball bearing connection between the hub 18 and the inner wheel 44 is replaced by a bushing 114. In FIG. 7, retaining ring 116 holds the hub 18 and inner wheel 44 axially together, and in FIG. 6, the hub 18 and inner wheel 44 would be held together axially by the shafts which they connect. Neither FIG. 6 or FIG. 7 illustrates a slide lock, which as stated above is not necessary to practice the present invention. It should be understood that the invention may be practiced with any form of engagement between the driving and driven members and a clutch of the invention, including splined, keyed, welded, bolted or other connections.

Preferred embodiments of the invention have been described in considerable detail. Numerous modifications and variations of the embodiments described will be apparent to those skilled in the art. For example, the disc portion 14 of the outer wheel 12 and the plate 76 of the collar 72 need not be solid, but either or both could be spoked, for example. Therefore, the invention should not be limited to the embodiments described, but should be defined by the claims which follow.

I claim:

1. An overload clutch for transmitting torque from a driving member to a driven member, comprising:

an outer wheel adapted for rotary engagement with one of said members, said outer wheel having a flange portion extending axially and a disc portion extending radially inwardly from said flange portion, said flange portion having a radially outward facing surface and a radially inward facing surface;

an inner wheel adapted for rotary engagement with the other of said members, said inner wheel having a radially outward facing surface in face to face proximity with the radially inward facing surface of said flange portion;

wherein said flange portion has defined within it at angularly spaced locations holes which extend radially from the inward facing surface of said flange portion to the outward facing surface thereof;

said outward facing surface of said inner wheel having defined therein recesses at angularly spaced locations, said recesses being in registration with said holes in at least one angular position of said inner wheel relative to said outer wheel;

a shear element received in each said hole, each shear element being sized so as to be moveable radially in its corresponding hole into or out of said recesses, each said shear element always being at least partially engaged in a corresponding hole;

a collar, said collar being axially displaceable between an engaged position and a disengaged position, said collar retaining said shear elements at least partially in said recesses in said engaged position and allowing said shear elements to completely exit said recesses in said disengaged position, said collar being cup-shaped with an axially extending sleeve and a plate extending radially inwardly from said sleeve, said sleeve having a radially inner surface with a first portion for retaining said shear elements at least partially in said recesses in said engaged position of said collar and having a second undercut portion positioned axially between said first portion and said plate for receiving at least a portion of said shear elements in said disengaged position, said plate facing said disc portion of said outer wheel; and an actuator for moving said collar from said disengaged position to said engaged position.

2. A clutch as in claim 1, wherein said actuator is an electromagnetic coil facing said plate of said collar.

3. A clutch as in claim 2, wherein said outer wheel has a hub and said coil is journaled on said hub.

4. A clutch as in claim 3, wherein an axial air gap exists between said coil and said plate of said collar in said engaged position.

5. A clutch as in claim 1, wherein said first portion of said surface of said collar confronts each said shear element with a surface which is ramped in the axial direction, said ramp angling radially outward in the axial direction in which the collar moves to go from the disengaged position to the engaged position.

6. A clutch as in claim 1, wherein said collar rotates with said outer wheel.

7. A clutch as in claim 1, wherein said actuator is a permanent magnet facing said plate of said collar.

8. A clutch as in claim 7, wherein said permanent magnet rotates with said collar.

9. A clutch as in claim 8, wherein an air gap exists between said collar and said magnet in the engaged position.

10. A clutch as in claim 1, wherein said actuator comprises at least one spring biasing said collar into said engaged position.

11. A clutch as in claim 10, wherein said at least one spring acts between said disc portion of said outer wheel and said plate of said collar.

12. A clutch as in claim 1, further comprising means biasing said collar out of complete disengagement and toward said engaged position.

* * * * *